(12) United States Patent
Nylander et al.

(10) Patent No.: US 9,986,496 B2
(45) Date of Patent: May 29, 2018

(54) METHOD IN A NETWORK NODE OF A WIRELESS COMMUNICATIONS NETWORK

(75) Inventors: Tomas Nylander, Värmdö (SE); Jari Vikberg, Järna (SE); Tomas Hedberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 426 days.

(21) Appl. No.: 13/877,202

(22) PCT Filed: Oct. 13, 2010

(86) PCT No.: PCT/SE2010/051100
§ 371 (c)(1),
(2), (4) Date: Apr. 1, 2013

(87) PCT Pub. No.: WO2012/050493
PCT Pub. Date: Apr. 19, 2012

(65) Prior Publication Data
US 2013/0208661 A1    Aug. 15, 2013

(51) Int. Cl.
*H04W 48/00* (2009.01)
*H04W 48/18* (2009.01)
*H04W 28/02* (2009.01)

(52) U.S. Cl.
CPC ....... *H04W 48/17* (2013.01); *H04W 28/0226* (2013.01); *H04W 48/18* (2013.01)

(58) Field of Classification Search
None
See application file for complete search history.

(56) References Cited

U.S. PATENT DOCUMENTS 6,636,502 B1 * 10/2003 Lager et al. .................. 370/352
6,973,313 B1    12/2005 Sebastian
(Continued)

FOREIGN PATENT DOCUMENTS

CN    101568149 A    10/2009
EP    1 821 467 A1    8/2007
(Continued)

OTHER PUBLICATIONS

Bouk, et al. Multiple end-to-end QoS Metrics Gateway Selection Scheme in Mobile Ad hoc Networks, Emerging Technologies, 2009. ICET 2009. International Conference on, vol., No., pp. 446-451, Oct. 19-20, 2009.
(Continued)

*Primary Examiner* — Hassan Kizou
*Assistant Examiner* — Roberta A Shand

(57) ABSTRACT

A method and network node for selecting a most suitable gateway for a User Equipment (UE) located in a wireless communications network. The network includes the network node and at least two gateways configured to provide packet data network connectivity to the UE located within a served cell. The network node detects a presence of a local gateway among the gateways and obtains UE information including a type of the UE. The UE type is either a stationary/fixed type or a mobile type, and the UE type is determined based on UE mobility behavior in relation to a local gateway service area. The network node selects the detected local gateway or another gateway among the at least two gateways for providing packet data network connectivity to the UE based on the determined UE type.

16 Claims, 10 Drawing Sheets

(56) References Cited

U.S. PATENT DOCUMENTS

| | | | |
|---|---|---|---|
| 7,006,796 B1* | 2/2006 | Hofmann et al. | 455/66.1 |
| 8,326,302 B2* | 12/2012 | Julka | 455/436 |
| 8,761,721 B2* | 6/2014 | Li | 455/404.2 |
| 2003/0129995 A1* | 7/2003 | Niwa | H04M 1/72522 455/456.1 |
| 2003/0137991 A1* | 7/2003 | Doshi | H04L 12/66 370/466 |
| 2006/0083205 A1* | 4/2006 | Buddhikot et al. | 370/338 |
| 2007/0287476 A1* | 12/2007 | Jeong et al. | 455/456.6 |
| 2007/0297439 A1 | 12/2007 | Ihattula | |
| 2008/0119209 A1* | 5/2008 | Upp | H04W 68/02 455/458 |
| 2009/0070854 A1 | 3/2009 | Gu et al. | |
| 2009/0228603 A1* | 9/2009 | Ritzau et al. | 709/238 |
| 2009/0279522 A1* | 11/2009 | Leroy et al. | 370/338 |
| 2009/0285179 A1 | 11/2009 | Jones et al. | |
| 2010/0218248 A1* | 8/2010 | Nice et al. | 726/12 |
| 2010/0232301 A1* | 9/2010 | Omori | H04W 48/16 370/252 |
| 2010/0240368 A1* | 9/2010 | Fox et al. | 455/435.3 |
| 2012/0184294 A1* | 7/2012 | Stojanovski | H04W 48/17 455/456.1 |
| 2013/0188515 A1* | 7/2013 | Pinheiro et al. | 370/254 |
| 2015/0230166 A1* | 8/2015 | Casati | H04W 36/12 370/328 |

FOREIGN PATENT DOCUMENTS

| | | |
|---|---|---|
| EP | 2 139 253 A1 | 12/2009 |
| WO | WO 2009/155823 A1 | 12/2009 |
| WO | WO 2010/102574 A1 | 9/2010 |
| WO | 2010127441 A1 | 11/2010 |
| WO | 2011034173 A1 | 3/2011 |

OTHER PUBLICATIONS

Iqbal, et al. An Improved Internet Gateway Discovery and Selection Scheme in Mobile Ad hoc Network, Electrical and Computer Engineering (ICECE), 2010 International Conference on, pp. 372-375, Dec. 18-20, 2010.

* cited by examiner

METHOD IN A NETWORK NODE OF A WIRELESS COMMUNICATIONS NETWORK

TECHNICAL FIELD

The present invention relates to a method in a network node and to the network node itself. In particular, it relates to selecting a gateway for user equipment in a wireless communications network.

BACKGROUND

Mobile Broadband (MBB) based on High Speed Packet Access/Long Term Evolution (HSPA/LTE) and other mobile communication standards has taken off as an important technology for connecting User Equipments (UEs) like e.g. mobile Personal Computers (PCs) to the Internet. As Mobile Broadband (MBB) takes off new types of equipment appears on the market such as Fixed Wireless Access (FWA) solutions. In addition, the usage of broadband wireless adaptors so called "dongles" and built-in MBB capabilities for PCs and laptops is increasing heavily. A dongle is a small piece of hardware that connects to a laptop or desktop computer. A dongle refers to a broadband wireless adaptor or in general to connectors that translate one type of port to another.

FWA is about providing end users such as UEs or PCs with fixed line services by utilizing a wireless technology, e.g. Universal Mobile Telecommunications System (UMTS), Global System for Mobile communications (GSM). Wideband Code Division Multiple Access (WCDMA), System Architecture Evolution/Long Term Evolution (SAE/LTE). Code Division Multiple Access (CDMA) or Worldwide Interoperability for Microwave Access (WiMAX) technologies. Most FWA solutions comprise specific Fixed Wireless Terminals (FWTs), also known as Mobile Broadband Routers (MBR). The FWTs offer a cost efficient way to provide high speed data, voice and fax services to small/home office and residential users.

A FWT is a box that from the end user perspective may be compared for example with an Asymmetric Digital Subscriber Line (ADSL) modem, and form a base station perspective the FWTs are seen as UEs. The FWT may also contain router functionality. Ethernet switch and WLAN functionality in order to give connectivity to several devices. However, the FWT normally uses a mobile network i.e. the wireless communications network, for backhaul and Internet connectivity instead of the fixed broadband. In a hierarchical wireless communications network backhaul links are links of the wireless communications network which comprise intermediate links between the Mobile Core Network (mobile CN), normally via a macro Base Station (macro BS), and home Base Stations (home BSs) at the "edge" of the entire hierarchical network. i.e. typically wired connections.

FIG. 1 depicts main principle of how FWA and FWT implementation may appear. The FWT device 1 here is for example located in an end user's home 2, normally in a same location all the time i.e. there is no real mobility related to the FWT except "nomadicity". i.e. that the FWT could be powered off in one place, moved to another location and then powered on again. The FWT 1 normally provides local connectivity and services for end user equipments located in the home 2 using for example WLAN/WiFi 3 or Ethernet 4 as the media for communication. Examples of end user equipments may for example be a printer 5, a PC 6 or a cable TV box 7. In addition, the FWT may provide support for connectivity for multiple legacy services, for example a fixed phone 8 or a fax 9. The FWT may then directly be connected to mobile RAN 10 and further on to a mobile CN 11 and by which the FWT may for example provide access towards the Internet 12. A dongle 13 attached to the PC 6 may similarly provide connectivity to the Internet 12 for the PC 6 by using the wireless communications network 100, via the RAN 10 directly. Additionally, a Network Attached Storage (NAS) 14 may also be connected to the FWT1 via said WLAN/WiFi 3 connection. Normally, the NAS 14 includes different material like movies, music, pictures that other devices i.e. end-user devices such as the PC 6, may access.

To the wireless communications network 100, these devices, stationary UEs e.g. FWT 1 and PCs 6 with dongles 13 appear as normal User Equipments (UEs), even though they are more or less stationary and do not require a high degree of mobility, compared to UEs (mobile phones) in general, which the wireless communications network is generally designed for. Due to the increased number of FWTs and PCs connecting with dongles to the RAN 10 directly or via a FWT, on the market data traffic generated by these equipments is increasing substantially causing a heavy load on the mobile CN.

FIG. 2a depicts another view of general prior art wireless communications network 100 that, according to this example, uses SAE/LTE technology to provide backhaul connection for UEs and wherein the architecture illustrates a non-roaming architecture for 3GPP accesses. However other technologies may similarly be presented here such as e.g. WCDMA. GSM/Enhanced Data Rates for GSM Evolution (EDGE) or WiMAX.

The wireless communications network 100 using SAE/LTE technology comprises a User Equipment (UE) 101, an Evolved UMTS Terrestrial Radio Access Network (E-UTRAN) 107, a Mobility Management Entity (MME) 103, a Serving Gateway (S-GW) 104. Packet Data Network Gateway (PDN GW) 105 and a Home subscriber server (HSS) 106. Even though the S-GW 104 and the PDN GW 105 are indicated as separate entities, they may be combined in a single entity, not shown in FIG. 2a. The wireless communications network normally comprises several S-GW 104/PDN GW 105 nodes which are considered to be global gateway nodes.

Continuing with the description of FIG. 2a, the E-UTRAN 107 is a radio access network that interfaces both to the UE 101 and the core network nodes. The E-UTRAN 107 may comprise an eNB 102, also called eNodeB, with a transmitter and a receiver for communicating with the UE 101. Alternatively, the eNodeB 102 may also comprise a local Gateway (local GW) 1020 which may provide access towards the Internet(/Intranet). The local GW 1020 may also be located separately nearby the eNodeB 102. The Local GW 1020 may also comprise total S-GW/PDN GW functionality, or just a subset of the functionality. Many such local GWs may exist in parallel in the wireless communications network 100.

The MME 103 is a key control-node for the LTE radio access network. It is involved in the bearer activation/deactivation process and is also responsible for choosing the S-GW 104 for the UE 101 at initial attach and at time of intra-LTE handover involving Core Network (CN) node relocation. The MME 103 may further be in connection with a Serving GPRS Support Node (SGSN) 109 which is a main component of GSM/GPRS and UTRAN/WCDMA packet domain networks, and which handles all packet switched data oriented functions within the network. e.g. mobility management and authentication of the UEs. Note that the SGSN 109 may further be in near connection with the MSC i.e. logically separate nodes but still physically integrated.

The S-GW 104 routes and forwards user data packets, while also acting as the mobility anchor for the user plane during inter-eNI handovers and as an anchor for mobility between LTE and other 3GPP technologies. The user plane is functions that deal with issues of user-to-user information transfer and associated controls. The S-GW 104 manages and stores UE 101 contexts, e.g. parameters of the IP bearer service and network internal routing information.

The PDN GW 105 provides connectivity to the user equipment 101 to external packet data networks and IP services 108 provided by different operators by being the point of exit and entry of traffic for the UE 101. A UE 101 may have simultaneous connectivity with more than one PDN GW for accessing multiple PDNs. The PDN GW 105 performs policy enforcement, packet filtering for each user, charging support, lawful Interception and packet screening. Another key role of the PDN GW is to act as the anchor for mobility between 3GPP and non-3GPP technologies such as WiMAX and 3GPP2 (CDMA 1X and EvDO). The PDN GW 105 is normally in connection with a Policy Charging and Rules Function (PCRF) node 110 which is the node designated to in real-time determine policy rules in a multimedia network.

The HSS 106 manages the subscriber information and location information of the user equipment 101.

The reference points illustrated in FIG. 2*a* are: LTE-Uu which is the reference point between the UE and the eNodeB; S1-MME which is the reference point for a control plane protocols between the E-UTRAN 107 and the MME 103; S1-U which is the reference point between the E-UTRAN 107 and the S-GW 104 for a per bearer user plane tunnelling and inter eNodeB path switching during handover; S3 which enables user and bearer information exchange for inter 3GPP access network mobility in idle and/or active state: S4 which provides related control and mobility support between GSM/GPRS Core and WCDMA/UTRAN packet core networks and 3GPP Anchor function of S-GW 104. In addition, if a "Direct Tunnel" is not established, it provides user plane tunnelling; S5 which provides user plane tunnelling and tunnel management between S-GW 104 and PDN GW 105, and is used for S-GW 104 relocation due to UE 101 mobility and if the S-GW 104 needs to connect to a non-collocated PDN GW 105 for a required PDN connectivity; S6*a* which enables transfer of subscription and authentication data for authenticating/authorizing UE 101 access to an evolved system (AAA interface) between MME 103 and HSS 106. Gx which provides transfer of Quality of Service (QoS) policy and charging rules, from PCRF 110, to a Policy and Charging Enforcement Function (PCEF) in the PDN GW 105; S10 is the reference point between MMEs for MME relocation and MME to MME information transfer; S11 is the reference point between the MME 103 and the S-GW 104. S12 is the Reference point between UTRAN and S-GW 104 for user plane tunnelling when "Direct Tunnel" is established. It is based on an Iu-u/Gn-u reference point using GPRS Tunneling Protocol-Users (GTP-U) protocol as defined between the SGSN 109 and the UTRAN or respectively between SGSN 109 and Gateway GSN (GGSN), and wherein usage of the S12 is an operator configuration option; SGi is the reference point between the PDN GW 105 and a packet data network and wherein the packet data network may be an operator external public or private packet data network or an intra operator packet data network 108, e.g. for provision of IMS services. Rx is the Rx reference point that resides between the PCRF 105 and the packet data network 108.

Following from FIG. 2*a*, now FIG. 2*b* further shows how a FWT 201 is logically built up and located within the wireless communications network 100 i.e. towards the SAE/LTE network, which in this illustration is the E-UTRAN 107. The FWT 201 according to this illustration comprises a Home Gateway 203 (Home GW) and an UE 202 part that uses the LTE-Uu interface for access and communication with the E-UTRAN 107. Generally, the FWT 201 also comprises a Subscriber Identity Module/Universal Subscriber Identity Module (SIM/USIM) card, as normally would the UE and other terminals connected to the mobile operator's network. The left side of the FWT is shown as a Home GW that provides a "Home" or "Residential LAN" connectivity for the devices in the home, as illustrated in FIG. 1. For example, in FIG. 1, a PC 6 may use WLAN to attach to a Home LAN provided by the Home GW and thereby connectivity to services provided by other devices in the Home LAN.

In LTE/SAE systems, the wireless communications network 100 provides Internet connectivity from the PDN GW 105, as illustrated by FIG. 2*a* and FIG. 2*b*. In a 3G (WCDMA) system a corresponding node is called GGSN wherein the GGSN may comprise the functionalities of both a Serving-GW and a PDN GW. Normally only a few of these nodes exists in a wireless communications network 100. Which node a UE should use for communicating is selected when a connection is/has been established. Often, the S-GW and the PDN GW are combined in one node, even though they are illustrated as separate nodes in the figures.

According to prior art, selection of a PDN GW 105 (or S-GW/PDN GW node) is based on data configured for the UE 101 in the HSS 106, or based on predefined so-called Access Point Name (APN) which the UE 101 sends in at a request for establishment of a connection. The APN is then "mapped" to a specific PDN GW. The selection of a S-GW 104 is based on network topology and may further be based on possible preferences to avoid changing S-GW, i.e, the latter to optimize for mobility. In LTE/SAE, these selections are normally performed by the MME 103. It is also very common that the S-GW 104 and PDN-GW 105 are co-located which needs to be taken into account in the PDN GW and S-GW selection.

As described above, a PDN-GW could be selected based on data stored in the HSS 106 for a UE 101 or on data stored in the UE. This is however a very static way normally requiring manual action in order to set and change data in the HSS. For example a lot of operation and maintenance (O&M) is required to handle when subscribers i.e. FWT 1, PC 6 with dongle 13, are moving to other apartments/houses (locations) in the case when information about the PDN-GW to be used would be stored in the HSS.

With the introduction of Local IP Access (LIPA) and Selective IP Traffic Offload (SIPTO) which are features that make it possible to optimize transport of user plane transport for a UE at the expense of mobility support for the UE, and a massive growth of MBB users which most often are stationary in the wireless communications network 100 there is a need to have an efficient selection procedure of a S-GW/PDN GW for these users e.g. FWTs and PCs with dongle.

SUMMARY

It is therefore an object of the present disclosure to provide a method and a network node for selecting a most suitable gateway for a UE located in a wireless communications network. More particularly, the selection of a gateway, that is most suitable to serve a UE, is based on mobility behaviour of a UE i.e. dynamic detection of UE movements in relation to a local gateway service area, if such a gateway exists.

According to a first example embodiment, the object is achieved by a method in a network node for selecting a gateway for user equipment in a wireless communications network. The wireless communications network comprises the network node and at least two gateways being configured to provide packet data network connectivity to the user equipment located within a served cell. The method comprises detecting a presence of a local gateway among the at least two gateways and obtaining user equipment information comprising a type of the user equipment. The type of the user equipment being one of a stationary/fixed type or a mobile type and wherein the type of the user equipment is determined based on user equipment mobility behaviour in relation to a local gateway service area. The method further comprises selecting the detected local gateway, or another gateway among the at least two gateways, for providing packet data network connectivity to the user equipment, wherein the selecting is based on the determined type of the user equipment.

According to a second example embodiment, the object is achieved by a network node for selecting a gateway for user equipment in a wireless communications network. The wireless communications network comprises the network node and at least two gateways being configured to provide packet data network connectivity to the user equipment located within a served cell. The network node comprises a detecting circuit configured to detect a presence of a local gateway among the at least two gateways and an obtaining circuit configured to obtain user equipment information comprising a type of the user equipment. The type of the user equipment being one of a stationary type or a mobile type and wherein the type of the user equipment is determined based on user equipment mobility behaviour in relation to a local gateway service area. The network node further comprises a selecting circuit configured to select the detected local gateway or another gateway among the at least two gateways for providing packet data network connectivity to the user equipment. The selecting is based on the determined type of the user equipment, An advantage achieved according to the above mentioned embodiments is that the load in the wireless communications network may be distributed more homogeneously across detected local gateways.

Another advantage is to provide possibility to detect and keep track of mobility behaviour of UEs on different levels, i.e, if UEs are stationary or not, and thereby relieving an operator from a significant and costly management task. This knowledge can further be used to select an appropriate gateway, and further reduce OPEX.

BRIEF DESCRIPTION OF THE DRAWINGS

The invention is described in more detail with reference to attached drawings illustrating exemplary embodiments of the invention and in which.

DETAILED DESCRIPTION

Figure 1:
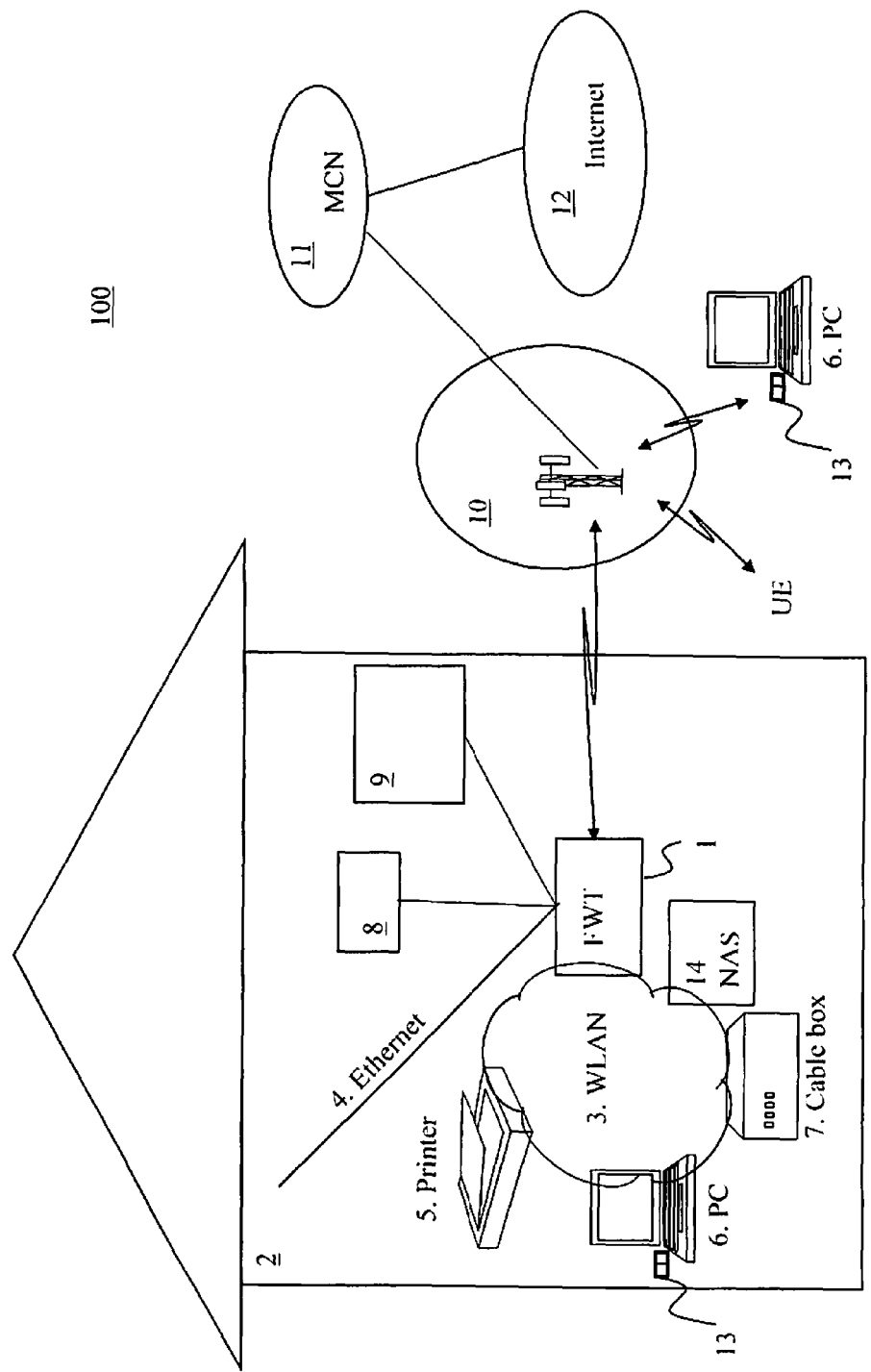
FIG. 1 is a schematic block diagram illustrating embodiments of a wireless communication network.
Figure 2A:
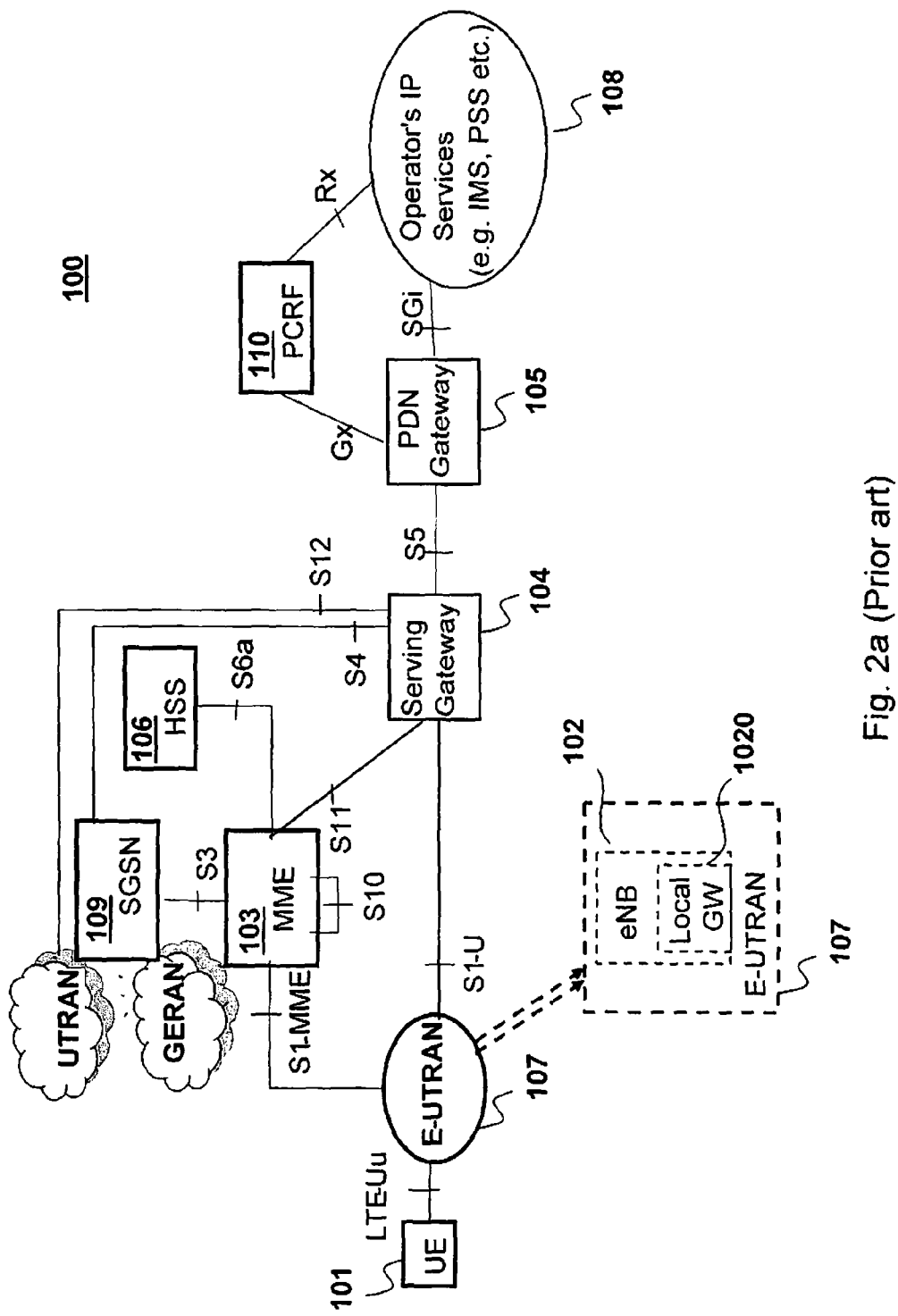
FIG. 2a is another schematic block diagram illustrating embodiments of a wireless communication network.
Figure 2B:
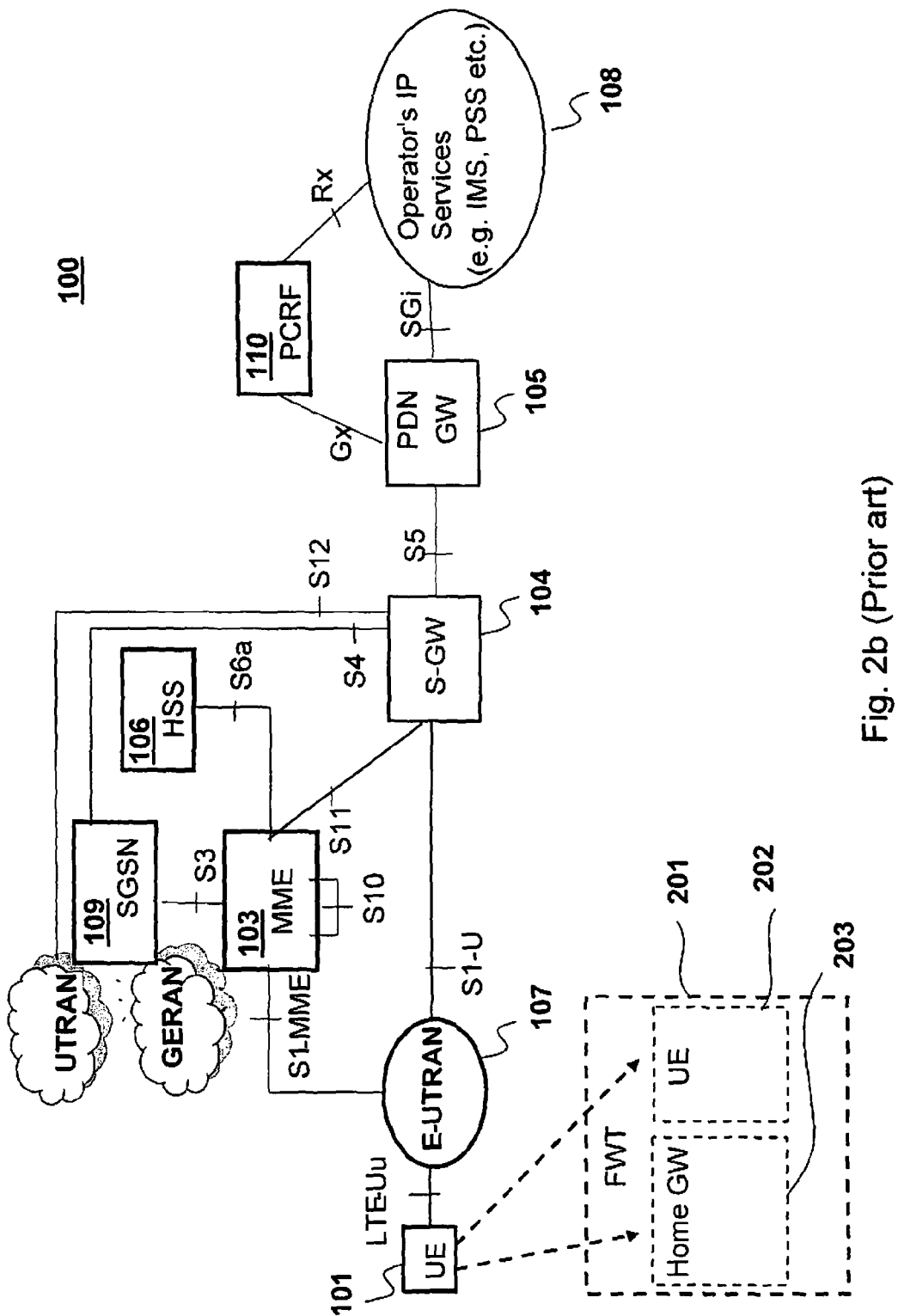
FIG. 2b is another schematic block diagram illustrating embodiments of a wireless communication network.
Figure 3A:
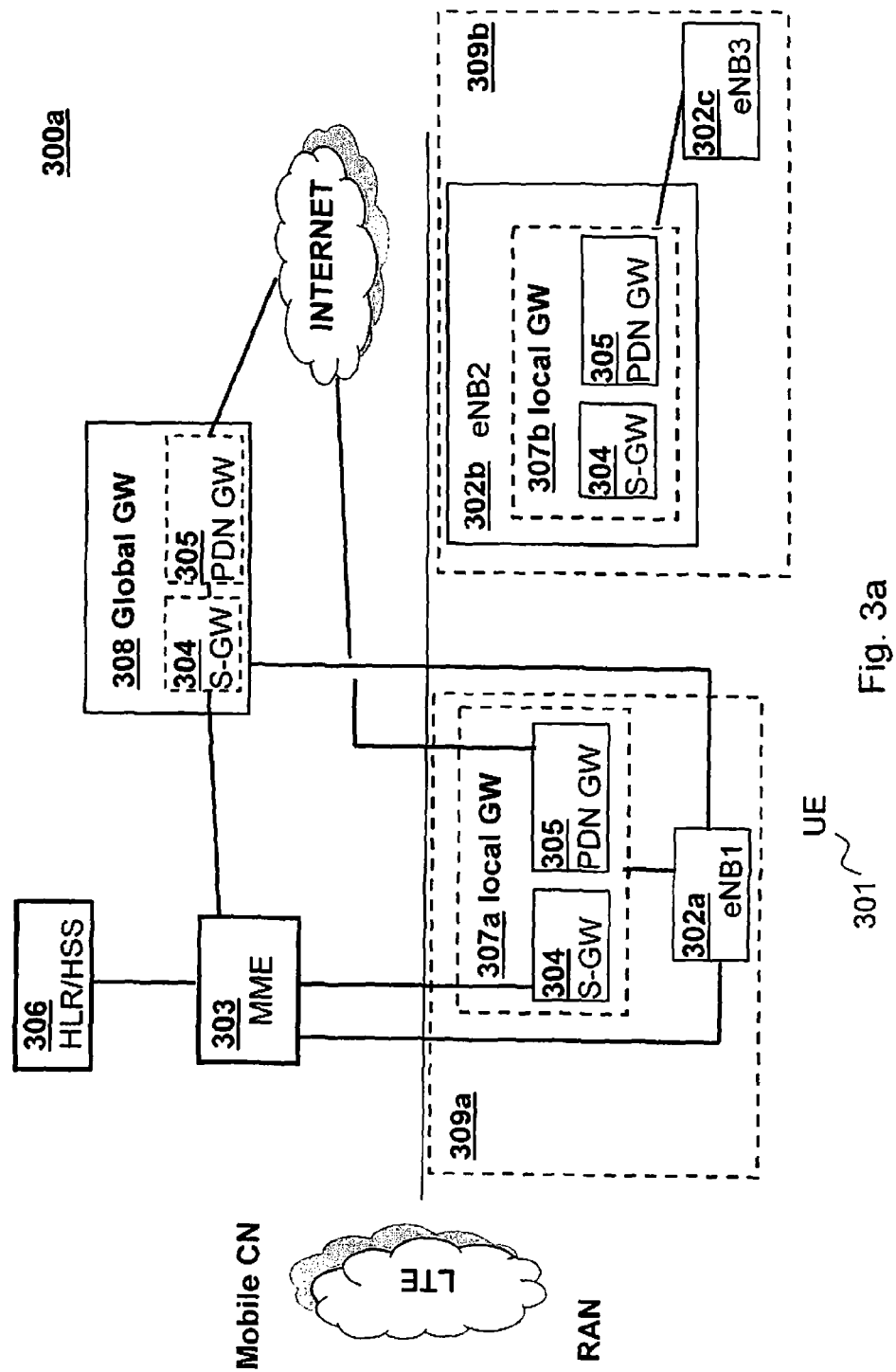
FIG. 3a is another schematic block diagram illustrating further embodiments of an LTE wireless communication network.

FIG. 3a is a schematic block diagram depicting example of embodiments of an SAE/LTE wireless communications network 300a. The wireless communications network 300a comprises a UE 301 that is being served by an eNB1 302a of a Radio Access Network (RAN). The eNB 302a is further in connection with an MME 303 node. The eNB 302a is normally serving one or more cells, not shown in FIG. 3a, in which the UE 301 may be located. Two cells may be overlapping in an overlapping area and the UE may be located in that overlapping area but still belonging to one served cell. The MME 303 is normally physically located in the mobile CN remote from the eNB1 and connects to a HLR/HSS 306, and normally to a global gateway 308 that also may be located in the mobile CN. One or more local GWs (307a; 307b) may exist in the wireless communications network 300a. Each local GW (307a; 307b) may comprise an S-GW 304 node and/or a PDN GW 305 node, as shown by the dashed lines in FIG. 3a. The local GW 307a may be located separately from the eNB1 a, or as part of the eNB b. The local GW may also be in connection with more than one eNB, e.g. local GW 307b connecting to eNB2 302b and to eNB3 302c. The one or more local GWs (307a; 307b) may each have a defined local gateway service area (a; b) for them and wherein the local GW service area may cover one 309a or more 309b eNBs (302a; 302b; 302c). dashed lines in FIG. 3a. Note that the connections between the S-GW 304 of local GW b and the MME 303, as for the other connections corresponding to the ones of local GW 307a, eNB1 302a, PDN GW 305 etc, are not shown for simplicity and clarity of FIG. 3a.

Note that the wireless communications network 300a mentioned in the embodiments above is not restricted to include only one UE 301 or to this specific constellation of local GW contra eNBs, but that other constellations may exist also not illustrated here for simplicity.

Note also that the local GWs may be located in the RAN or in the mobile CN. Further on, the local GW service areas (309a; 309b) may be predefined in the local GWs or downloaded from another network node e.g, the MME 303 or the HSS 306.

Another important issue is that the wireless communications network 300a is not limited to a LTE network but may also be a WCDMA network or any other similar wireless communications network having several gateways to keep track of and to define local GW service areas for.

Figure 3B:
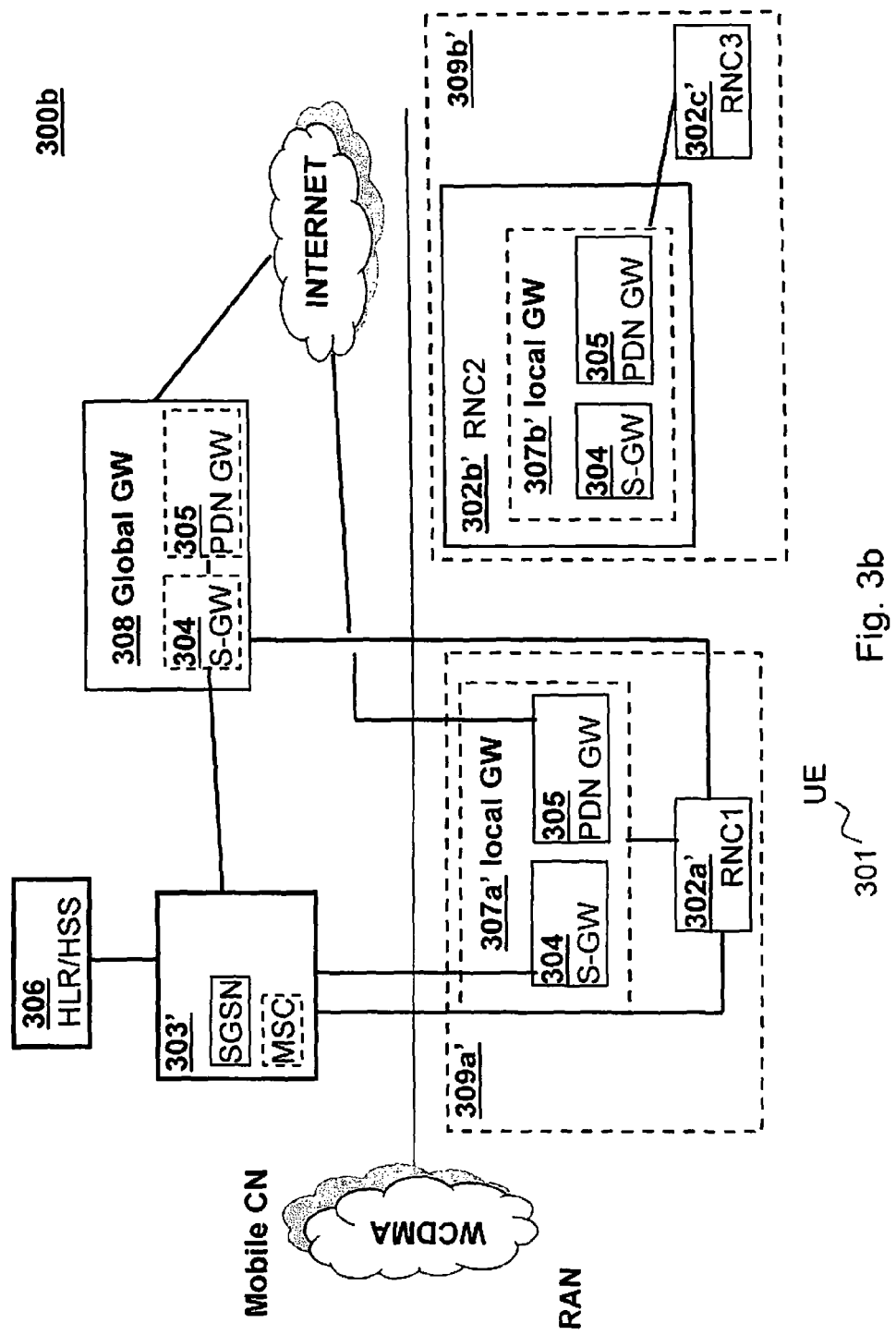
FIG. 3b is another schematic block diagram illustrating further embodiments of a WCDMA wireless communication network.

Following from the description of FIG. 3a. FIG. 3b is a schematic block diagram depicting example of embodiments of a WCDMA wireless communications network 300b. The wireless communications network 300b comprises a UE 301 that is being served by a radio base station (not shown) which is further controlled by Radio Network Controller 302a' (RNC1) of a Radio Access Network (RAN). The RNC 302a' is further in connection with a core network node 303' e.g. SGSN, a MSC or a combination of though which are logically separated but physically incorporated in same node. The core network node 303' is normally located in the mobile CN and connects to the HLR/HSS 306, which may be the same node as in the SAE/LTE case described in relation to FIG. 3a, and normally to a global gateway 308 that also may be located in the mobile CN. Same as in FIG. 3a, one or more local GWs (307a'; 307b') may exist in the wireless communications network 300a. A local GW may also be in connection with more than one RNC, e.g. local GW 307b' connecting to RNC2 302b' and to RNC3 302c'. The one or more local GWs (307a'; 307b') may each have a defined local GW service area (309a'; 309b') for them and wherein the local GW service area may cover one 309a' or more 309b' RNCs (302a'; 302b'; 302c'), dashed lines in FIG. 3b. Note that the connections between the S-GW 304 of local GW 307b' and the core network node 303', as for the other connections corresponding to the ones of local GW 307a', eNB1 302a', PDN GW 305 etc. are not shown for simplicity and clarity of FIG. 3b.

Note that the local GWs (307a; 307b; 307a'; 307b') need not always be separate nodes or must be located in the RAN as shown in FIG. 3a and in FIG. 3b, but the local GWs (307a; 307b; 307a'; 307b') may as well be located in the mobile CN or incorporate into another network node both in RAN or mobile CN. Also, the wireless communications network (300a, 300b) may comprise local GWs deployed close to the RAN and at the same time local GWs deployed in the mobile CN, wherein some local GWs may be separate nodes and others may be incorporated into or parts of other network nodes e.g. the RNC, the SGSN, the MSC, the MME, the eNB etc.

Figure 4:
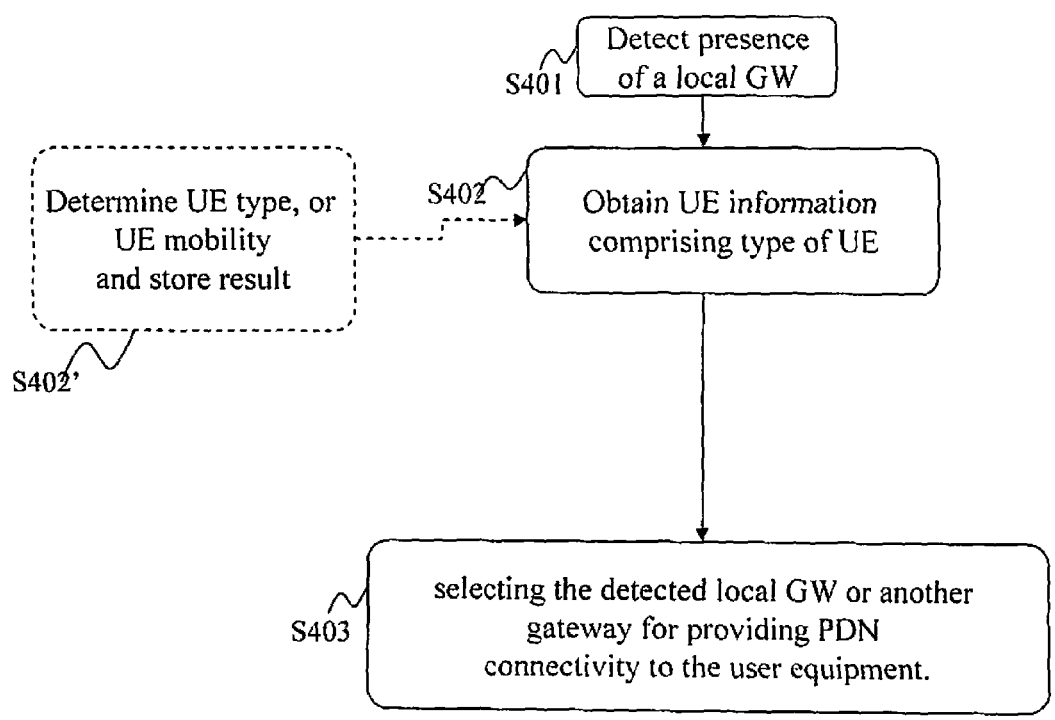
FIG. 4 is a flowchart depicting embodiments of a method in a network node.

FIG. 4 is a flowchart depicting embodiments of a method for selecting a gateway for a user equipment in such a wireless communications networks as the ones mentioned above in relation to FIG. 3a and FIG. 3b. The method, implemented in a network node, is for selecting a most suitable gateway for a user equipment 301 in a wireless communications network (300a; 300b) e.g. LTE or WCDMA. The term most suitable may relate to type of UE, capacity of a local GW, capacity of a local GW for a given time period etc.

Continuing with the description of FIG. 4, the wireless communications network (300a; 300b) comprises the network node and at least two gateways (307a; 307b; 307a'; 307b'; 308) being configured to provide packet data network connectivity to the user equipment 301 located within a served cell. The method comprises detecting S401 a presence of a local GW (307a; 307b; 307a'; 307b'), serving a local GW service area (309a; 309b; 309a'; 309b'), among the at least two gateways (307a; 307b; 307a'; 307b').

The detecting may be performed by receiving address information for the local GW (307a; 307b; 307a'; 307b') via, or directly from, one or more of the following nodes: a radio access node; a eNodeB; a Radio Network Controller, RNC: a Mobility Management Entity, MME; a global gateway; or a Serving GPRS Support Node, SGSN. Note, that address information may be received directly from the local GW as well (307a; 307b; 307a'; 307b'). The local GW (307a; 307b; 307a'; 307b') may during a setup procedure send address information to the network node from which the address information later on may be obtained/received. The address information may also be obtained via a backhaul link or directly from another network node in the mobile CN.

After detecting the presence of a local GW, user equipment information is obtained S402, and wherein the obtained UE information comprises a type of the UE 301, the type being one of a stationary type or a mobile type. Note that the type of the UE may be stationary type for all detected local GWs or vary dependent on a local GW in relation to a local gateway service area i.e. apply same type to any local gateway, or have one separate type per local gateway. The obtaining may for example cover the case when the RAN informs the MME about the current LTE Cell and wherein the MME then receives the rest of the information from HLR/HSS and/or has locally stored information about local gateway service areas. Thus obtaining UE information comprising the type of UE may be done by obtaining/requesting information from different nodes as well as determining locally or externally the type of the UE. The type of the user equipment 301 is determined based on user equipment mobility behaviour in relation to the local GW service area (309a; 309b; 309a'; 309b'). In an example of an embodiment the mobility behaviour may be previously detected/determined and stored in a network node e.g. MME, HSS/HLR etc to be obtained S402' when needed. Note that by stationary type it is meant that the UE is fixed or determined as non-mobile and that there is no restriction to that the method is limited to the end user being a UE, but may be as mentioned before a FWT or a PC i.e, the UE mobility is determined whatever "box" that the UE happens to be combined with. Still a UE that is considered to be fixed type UE may be moving within one or more cells served by one or more base stations e.g. eNBs, or RNCs.

In an example of an embodiment, the determining of the type of user equipment is performed in any one or any combination of: the UE; the MME; the HER; the HSS; the SGSN; the RNC; or the eNodeB.

In yet an example of an embodiment, the determination of mobility behaviour is based on information about user equipment movement(s) between cells in the wireless communications network. The local GW service area (309a; 309b; 309a'; 309b') may be predefined and stored in a network node e.g, the HLR, the HSS or the MME, and updated when needed. The local GW service area (309a; 309b; 309a'; 309b') may further include one or more of the following: a Radio Base Station: an eNodeB: or an RNC, to be served by the local GW, as shown by FIG. 3a and FIG. 3b.

After determining the type of the UE the method comprises selecting S403, based on the determined type of the user equipment 301, the detected local GW (307a; 307b; 307a'; 307b') or another gateway 308 among the at least two gateways (307a; 307b; 307a'; 307b'; 308) for providing packet data network connectivity to the user equipment 301.

In an example of an embodiment, the selecting S403 comprises selecting the detected local GW for providing packet data network connectivity to the user equipment 301, when the user equipment is determined to be a stationary type i.e. non-mobile in relation to a local GW service area.

In yet an example of an embodiment, the selecting S403 comprises selecting a global gateway 308 for providing packet data network connectivity to the user equipment 301, when the user equipment 301 is determined to be a mobile type. Note that a UE can be stationary in relation to multiple local GWs (307b; 307a'; 307b') other than the detected gateway 307a, and one of these may be selected as well. The method is thus not limited to the selecting of the global GW 308 for mobile type UEs, if the UE is considered mobile in relation to one local GW.

In yet an example of an embodiment, the selecting is further based on user equipment information comprising user equipment actual location in the wireless communications network e.g. when the UE is far from cell edges of the local GW service area, so that mobility classification in S402' may be less accurate.

In yet an example of an embodiment, the selecting is based on both the determined type of the user equipment and on a service type requested by the user equipment, wherein the service type requested by the user equipment may be obtained as part of the UE information, or as separately stored information. Different gateways, local GWs or a global GW, may thus be selected for one single UE, based on a combination of UE Type and service. The service type may for example be: a call setup; a packet data session with specific QoS requirements: or, a video conference call etc. The obtained UE information may be obtained directly from the UE or via any other network node where it is stored. The UE information and the service type may be stored together or separately in one or more of the following: the MME; the HLR; the HSS; the SGSN; the RNC; or the eNodeB.

In yet an example of an embodiment, the selecting is further based on obtained information indicating a capability of the local GW (307a; 307b; 307a'; 307b'). The obtained information indicating the capability is used to determine if the local GW (307a; 307b; 307a'; 307b') is serving many UEs and other devices e.g. FWTs or PCs, and therefore overloaded and thus not suitable, or if its capacity is high for the moment due to low traffic load.

Note, that combinations of the above mentioned embodiments are possible and that the selecting may for example further be based both on the service type requested by the UE and on the obtained information indicating the capability of the local GW i.e. together with the type of the UE.

Figure 5:
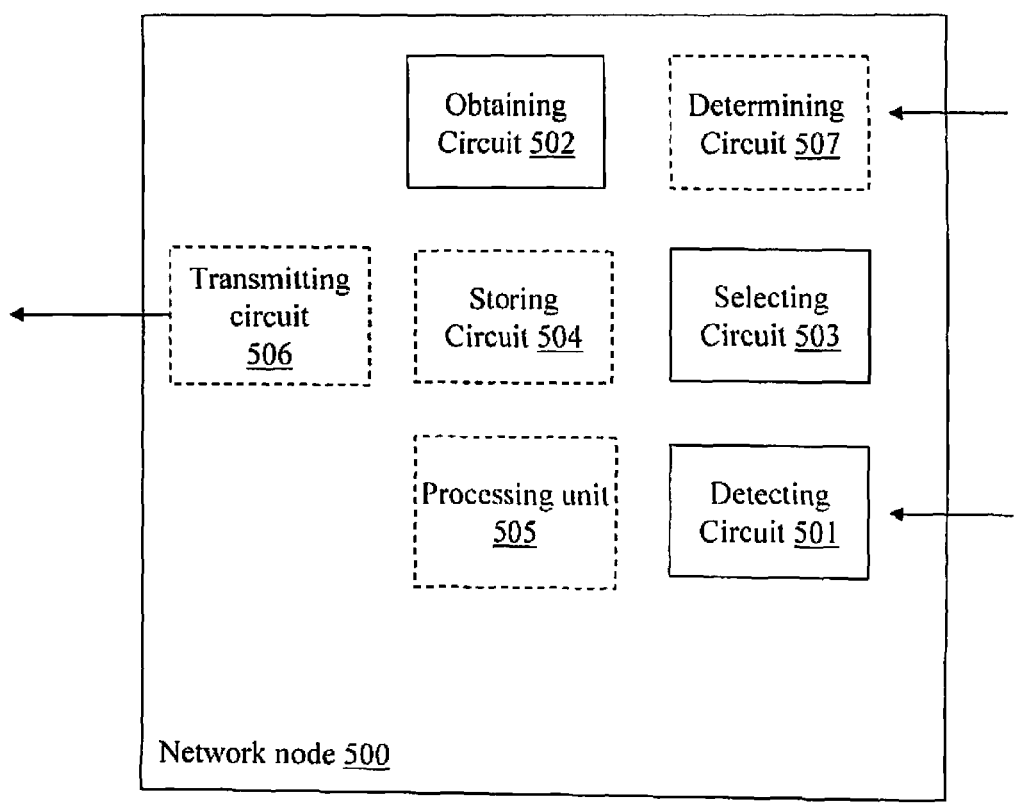
FIG. 5 is a schematic block diagram illustrating embodiments of a network node.

Following, FIG. 5 is a schematic block diagram illustrating embodiments of a network node 500 in which one or more of the above mentioned method embodiments may be implemented. The network node 500 in this illustration may be a separate node or have its functionality incorporated into another RAN or mobile CN node. The Network node 500 may for example be, or have its functionality incorporated as part of: the MME; the eNB; the RNC; a mobile CN node; or a RAN node. The network node 500 may further comprise S-GW 304 and/or PDN GW 305 functionality, fully or partly.

Continuing with the description of the network node 500 illustrated by FIG. 5, the network node 500 comprises a detecting circuit 501, an obtaining circuit 502 and a selecting circuit 503. The network node 500 may also comprise a storing circuit 504, a processing circuit 505 and a transmitter circuit 506.

The detecting circuit 501 is configured to detect a presence of a local GW (307a; 307b; 307a'; 307b'), serving a local GW service area (309a; 309b; 309a'; 309b'), among the at least two gateways (307a; 307b; 307a'; 307b'; 308). Detecting the presence of the local GW (307a; 307b; 307a'; 307b') may be achieved by receiving address information for the local GW (307a; 307b; 307a'; 307b') via, or directly from, one or more of the following nodes: a radio access node; an eNodeB; a Radio Network Controller, RNC; a Mobility Management Entity, MME; or a Serving GPRS Support Node, SGSN.

The obtaining circuit 502 is configured to obtain user equipment information comprising a type of the user equipment 301, the type being one of a stationary type or a mobile type. The type of the user equipment 301 is determined based on user equipment 301 mobility behaviour in relation to the local GW service area (309a; 309b; 309a'; 309b') e.g. statistical analyses of UE cell movements in the wireless communications network (300a; 300b).

In an example of an embodiment, the UE information indicating the type of the UE 301 is received at the network node from the UE 301 as part of an attach message.

In an example of an embodiment, the network node 500 comprises a determining circuit 507 see dashed lines in FIG. 5, which is configured to determine the type of the UE.

In another example of embodiment the determining circuit 507 is located in any one of the following nodes: the UE; the MME; the HLR; the HSS; the SGSN; the RNC; or the eNodeB.

In an example of an embodiment, the obtaining circuit 502 may be configured to obtain additional UE information comprising a service type requested by the user equipment and/or information indicating the capability of the local GW. The obtained UE information, additional or initial, is then used by the selecting circuit 503 to select the most suitable gateway, whether it is a local GW or a global GW. Typically the global gateway 308 is selected in case of the UE is of a mobile type and in cases wherein, the local GW to be selected, is heavily overloaded. The selecting circuit 503 is configured to select a detected local GW (307a; 307b; 307a'; 307b') among the at least two gateways (307a; 307b; 307a'; 307b'; 308) for providing packet data network connectivity to the UE 301 e.g. when the UE is of a stationary type, and when the UE request services not that capacity requiring and/or when the local GW has high capacity. The selecting circuit (503) is further configured to select, based on the obtained user equipment information, the local gateway, among the at least two gateways (307a; 307b; 307a'; 307b'; 308), to provide packet data network connectivity to the user equipment (301) when the user equipment type is of a stationary type.

In an example of an embodiment, the selecting circuit 503 is further configured to select a suitable gateway (307a; 307b; 307a'; 307b'; 308) among the at least two gateways (307a; 307b; 307a'; 307b'; 308) based on UE actual location in the wireless communications network (300a; 300b). For example, when the UE is far from the local gateway service area border, a local GW may be selected, although the classification of mobility type has low accuracy.

The UE information may be obtained from the UE directly e.g. when a user equipment context is created, or via/from any one of the following: a HLR; a HSS; a MME; a SGSN; or a MSC.

The storing circuit 504 may be configured to store predefined local GW service areas and/or UE information for subsequent use. The storing circuit 504 may continuously update the stored information e.g. periodically or upon UE requesting access etc. The storing circuit may be an integral part of the network node or located partly or fully in another RAN or mobile CN node.

The transmitter circuit 506 is configured to transmit data and other information as a normal radio base station or UE transmitter. As an example, when the network node 500 selects a non-local gateway e.g, the global GW 308, or a local GW (307a; 307b; 307a'; 307b') the network node 500 may inform the RAN or the mobile CN about the choice of gateway by signalling, via use of the transmitter circuit 506, see FIG. 5. The transmitter may therefore in this case send different associated data to inform RAN or mobile CN e.g. IP address for data. In case of the selected gateway is a local GW (307a; 307b; 307a'; 307b') managed by the RAN then the network node 500 may inform the RAN that a local GW (307a; 307b; 307a'; 307b') will be used, and may provide needed configuration information, such as Downlink Traffic Flow Template (DL TFT). Note that the transmitter 506 is typically used for any type of transmissions such as data or signalling.

Following are examples given on different levels of how information is obtained and may be used as basis for identifying whether an UE is stationary or mobile. One such information is the visited cells. However, in some, or most, cases it should be sufficient to determine UE mobility behaviour on eNB level. The main reason for determining mobility behaviour of the UE in eNB level is that it may be considered not really important if an UE moves between cells within a single eNB as the local GW would most probably be the same for all these cells served by the same eNB. This means that the UE should be identified as stationary as long as it moves between cells within a single eNB. Same logic can be applied in WCDMA for the RNC-level i.e, the local GW is very likely the same for the whole RNC. In case of a LTE/SAE network the local GW could also be shared between multiple eNB. In this case, the definition of an UE being stationary would be about the UE staying within the defined group of eNB that share the same local GW.

In an example of an embodiment, mobility detection may be determined on a registration area level i.e. one or more Routing Areas and/or Tracking Areas. This may beneficial in scenarios when the mobile CN nodes perform selection of the local GW on registration area level i.e. that the same local GW is to be used for whole defined registration area or more than one of these.

Following, more examples are provided for describing different methods to determine the type of the UE and how to store and obtain that information. Note that the type may be determined at any time, dynamically or time based i.e. at certain predefined time periods after access/connection to the RAN.

A first example is now presented for a mobile CN based determination/detection of type of UE in an LTE/SAE network. According to this example an eNB knows about the UE mobility on cell level and may build up history needed to find out if an UE is stationary or not. If a UE moves between two different eNBs then the UE history information transmitted between eNBs may be used to find out how "mobile" the UE is. In this example the local GW service area may cover one or more cells. The eNB in RAN reports mobility behaviour of UEs to the MME in the mobile CN using a new S1AP message or a new parameter in an existing S1AP message on an existing signalling connection, for example when the S1AP signalling connection is being released. The reports may comprise UE type and an actual location e.g. one E-UTRAN Cell Global Identifier (E-CGI) or limited number of E-CGIs or alternatively eNB-ID or a limited number of evolved NodeB Identifiers (eNB-IDs). The E-CGI is normally used to identify cells globally. The ECGI is constructed from a Mobile Country Code (MCC), Mobile Network Code (MNC) and an E-UTRAN Cell Identifier (ECI).

Figure 6:
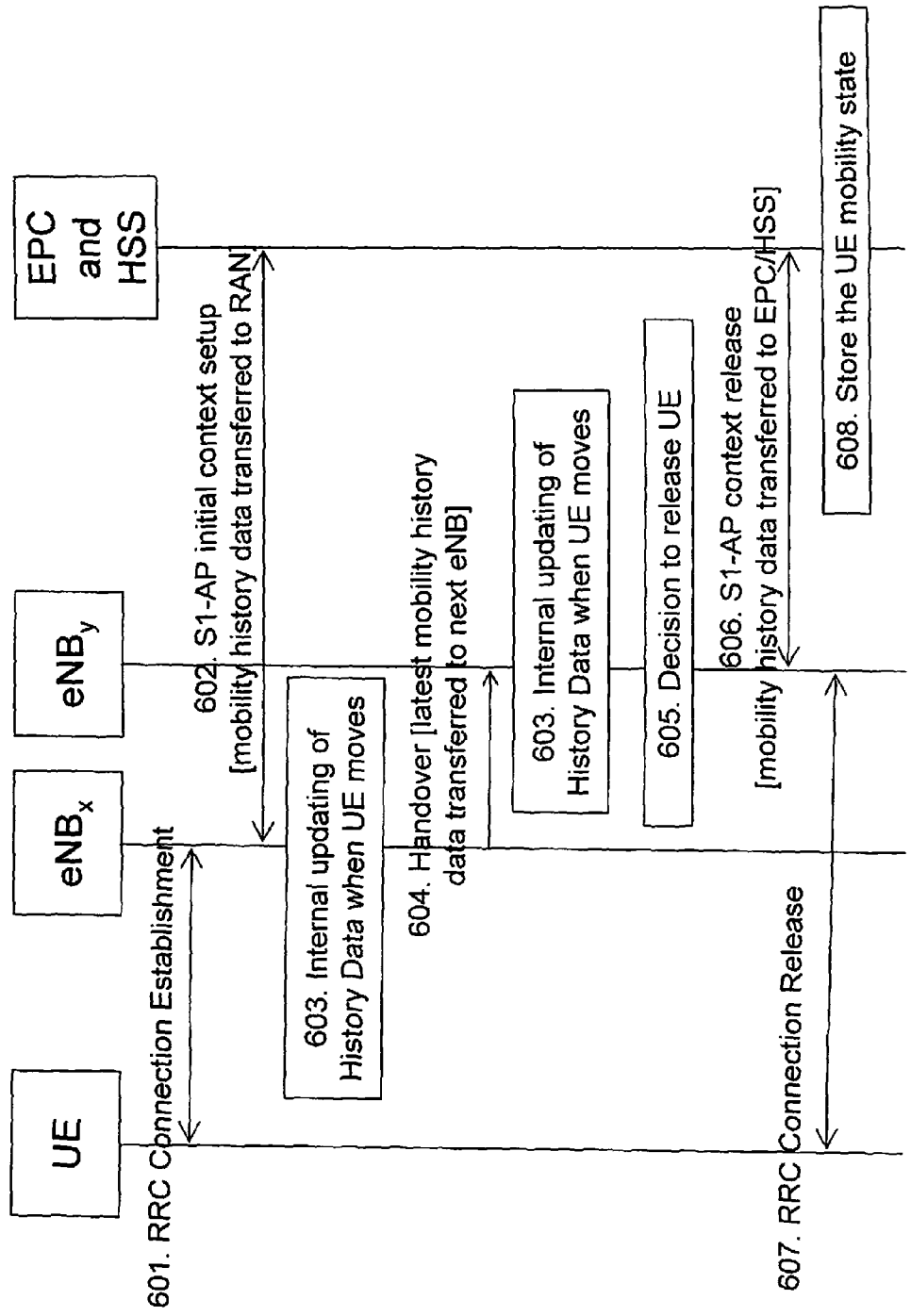
FIG. 6 is a signalling scheme illustrating an example of an embodiment for a mobile CN based determination/detection of type of UE in an LTE/SAE network.

An aspect of this first example specific for LTE and Evolved Packet Core (EPC), and which may be extended to cover UTRAN, may be illustrated as in FIG. 6.

In step 601 the process of making an association between RAN and mobile CN is initiated i.e. UE establishing connection to eNBx (302a; 302b; 302c) by use of RRC connection establishment signalling.

In step 602 the UE state information is transferred from the CN to the RAN e.g. by use of S1-AP initial context setup. The RAN node in this case eNBx (302a; 302b; 302c) requests/receives mobility history data.

In step 603 a RAN node records mobility history within one or more cells managed by the RAN node. The history data is then internally updated. Note that updating may be performed and stored in another node as well or in several nodes e.g. at eNBx (302a; 302b; 302c) and/or at eNBy (302a; 302b; 302c).

In step 604 a handover procedure between RAN nodes is performed i.e. eNBx to eNBy. The latest mobility history is transferred.

In step 605 the RAN node(s) decides to release the UE 301, e.g. due to inactivity or loss of coverage.

In step 606 the RAN node e.g. eNBx or eNBy, uploads the UE mobility state information to the CN i.e. by use of S1-AP context release message. The mobility history data is then transferred to EPC/HSS (303; 306).

In step 607 the UE 301 is released by use of RRC connection release which is shown for completeness only.

In step 608 the UE mobility state/type is stored in EPC/HSS (303; 306) for future use.

The operation of determining if the UE 301 is stationary or not in relation to local gateway service area(s) based on the mobility history data may be done in different ways such as:

in the RAN node(s) at each step 603, in this case the RAN node(s) is configured with mapping from CGI, TAI, eNB ID etc to local gateway service area(s), or the RAN nodes may receives the information from the CN.

in the CN at step 608.

Further to the above the MME 303 in the mobile CN reports the mobility behaviour of UEs 301 to the HLR/HSS 306 where the information may be stored for future use. Information reported comprises UE type i.e. mobile type or stationary type, and in some cases the actual location, as defined above may be received from the eNB (302a; 302b; 302c). The MME 303 then reports the type of the UE 301, and in some cases the actual location, to the HLR/HSS 306 using a new Mobile Application Part message (MAP message) or new parameter(s) in an existing MAP message, for example when UE context is released/created in the MME 303. The term actual location may comprise different entities, depending on detailed implementation. Examples of such entities are:

"local GW service area", comprising for example:

One or more of Tracking Area Identities (TAI) e.g, if a local GW service area is a number of TAs One or more eNB-IDs (e.g, if a local GW service area is a number of eNB cells)

One or more E-CGIs (e.g, if a local GW service area is a number of cells)

There are two exceptions when the eNB (302a; 302b; 302c) does not know that the UE 301 has moved outside the local GW service area (309a; 309b): First. A UE 301 may move without the source providing UE history information to the target eNB (302a; 302b; 302c); Secondly, the length of the UE history information may be insufficient to capture UE movements outside the local GW service area. The list length is maximum 16 cells.

The second exception may be solved by adding an "accumulated mobility indicator" bit to UE history information. This bit is set by the eNB (302a; 302b; 302c) whenever the UE 301 has moved outside the local GW service area (309a;

309b). In order for the eNB to manage this indicator, the eNB must know which local GW service area is applicable. If multiple GWs are possible, then one indicator bit per GW is needed.

The first exception occurs if UE mobility does not use a handover procedure. This normally happens when:
  a. Network terminates Radio Resource Control connection (RRC Connection e.g. due to inactivity or that RRCConnectionRelease with RedirectedCarrierinfo is used instead of handover procedure. UE then goes to Idle state and moves to a new location. Communication 're-starts' in the new location. A new eNB does not know if this UE has been active earlier. The RRC is a sub-layer of radio interface Layer 3 existing in the control plane only which provides information transfer service to the non-access stratum. RRC is responsible for controlling the configuration of radio interface Layers 1 and 2.
  b. UE suffers from 'Radio Link Failure'. e.g. due to long Discontinuous Reception (DRX), attempts RRC Connection re-establishment but fails and goes to Idle state. Continues as in bullet a above.
  c. Handover is attempted but fails and UE ends up in a cell, which is not 'prepared'. Continues as in bullet a above.
  d. UE has performed handover from E-UTRAN to other Radio Access Technology (RAT) and back. At handover to other RAT the UE History Information may be omitted.

In all first exception cases, eNB cannot alone with complete certainty determine if UE only moves within the local GW service area. Hence eNB reports UE mobility behaviour to MME, e.g. when releasing the UE Context, and the MME accumulates the UE mobility behaviour.

The second example is now presented relating to MME based determination of the type of the UE. According to this example the MME may determine that a UE is stationary or mobile. One such way is a use of existing different service requests as these are carried in S1: INITIAL UE MESSAGE or S1: UPLINK NAS TRANSPORT and these messages always include current E-CGI, TAI, and (implicitly) the eNB-D. In other words, already existing signalling in the S1 interface may be used e.g. by the MME, to detect UE movements within the local GW service area by looking at a) the received E-CGIs, TATs and/or eNB-IDs, b) at the local definition of the different local GW serving areas. Another possibility for UEs in connected mode is the absence of PATH SWITCH REQUEST—messages which would indicate that the UE has remained within one eNB. If inter-eNB handovers occur, then the PATH SWITCH REQUEST— message will tell eNB about the new E-CGI and TAI. Note that a new "location indicator" information elements may be added. One example is that the identities of the local gateway service area(s) are included.

Figure 7:
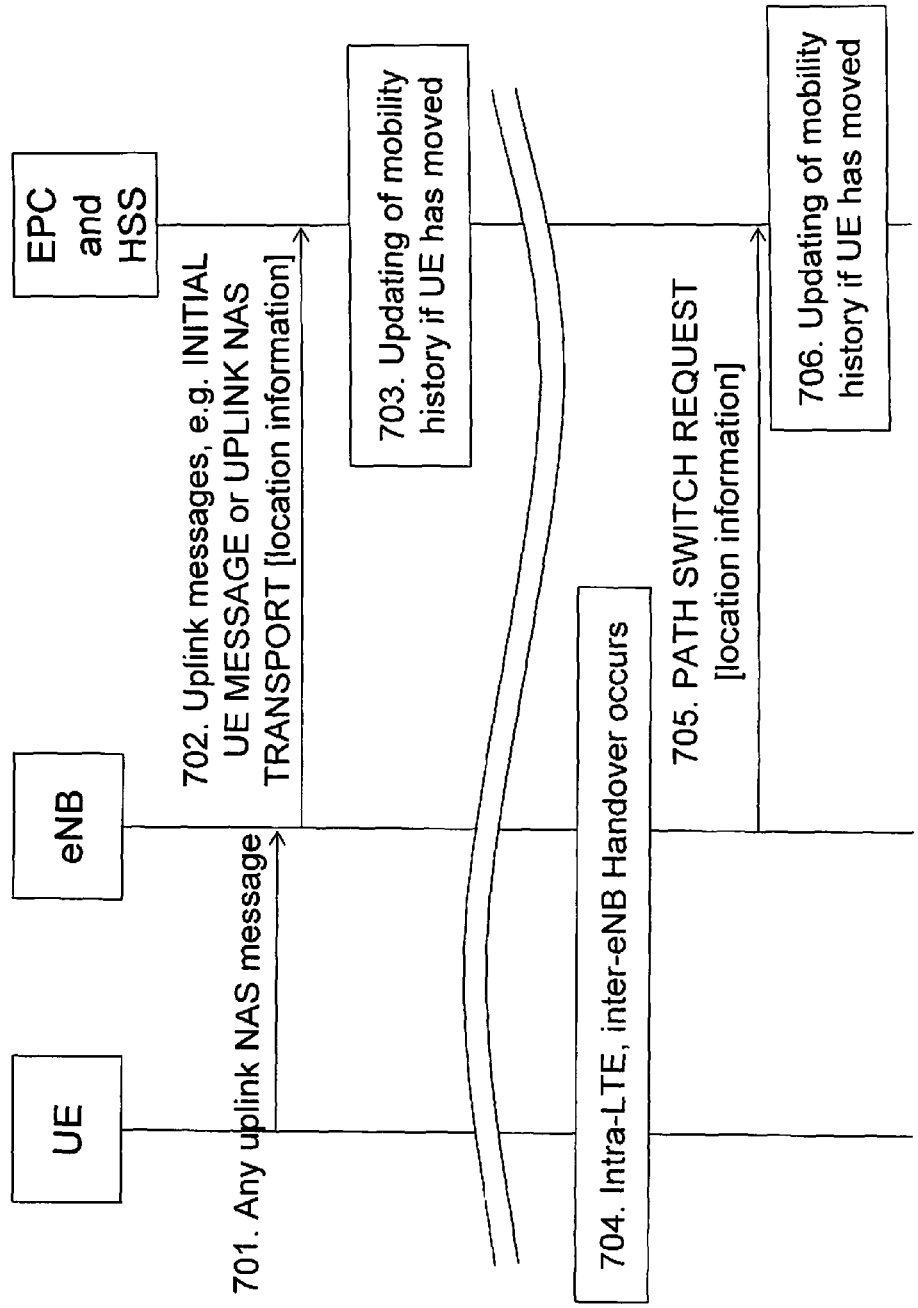
FIG. 7 is a schematic scheme illustrating an example of an embodiment relating to MME based determination/detection of the type of the UE

This example may be illustrated as in FIG. 7.

In step 701 a eNB (302a; 302b; 302c) receives uplink NAS message(s) from a UE 301. Examples of NAS messages across S1: ATTACH REQUEST. SERVICE REQUEST, EXTENDED SERVICE REQUEST, TRACKING AREA UPDATE REQUEST.

In step 702 the RAN node i.e. eNB (302a; 302b; 302c), forwards any uplink NAS message adds. The eNB (302a; 302b; 302c) may add UE location state information, before forwarding the NAS message to the EPC/HSS (303; 306), or in some cases to the MME 303.

In step 703 the EPC/HSS (303; 306), determines if the UE 301 is stationary in relation to local gateway service area(s) (309a; 309b) and, if the UE 301 has moved, the UE mobility history is updated at EPC/HSS (303; 306).

In step 704 inter-eNB (302a; 302b; 302c) handover may have occurred which also may be seen as intra-LTE handover procedure. This is another aspect of the example of how UE mobility history is updated.

In step 705 the eNB (302a; 302b; 302c) informs the EPC/HSS, or the MME, about change of UE location, when UE mobility history update is triggered by handover. Step 705 is thus followed by step 706 which is the same as step 703.

Following above, the MME 303 in the mobile CN may report mobility behaviour of UEs to the HLR/HSS 306, where the reports may be stored for future use. The reports may comprise UE type i.e. moving or stationary. The reports may also comprise an actual location of the UE.

In an aspect of this example, the MME 303 reports the type of the UE 301, and the actual location, to the HLR/HSS 306 using a new MAP message or a new parameter in an existing MAP message, for example when UE context is released in the MME.

Following is a third example presented for a mobile CN based determination/detection of type of UE 301 in a WCDMA network 300b. The overall method/procedure is similar to the SAE/LTE network 300a method/procedure described in the first example above. The same overall sequence flow applies, except that MME 303 is replaced by SGSN/MSC 303' and eNB (302a; 302b; 302c) is replaced by RNC (302a'; 302b'; 302c').

In a first aspect of the third example, a RNC (302a'; 302b'; 302c') based UE type determination/detection will now be described. The RNC (302a'; 302b'; 302c') is normally aware about UE mobility behaviour on cell level while the UE 301 is in RRC Connected state and the RNC (302a'; 302b'; 302c') may build up history needed to find out if an UE 301 is stationary or not. In addition, it is very likely that it is not even needed to analyze the UE mobility behaviour on cell level i.e, if one local gateway supports the all cells controlled by the RNC (302a'; 302b'; 302c') it may be enough to determine if the UE 301 stays within same RNC service area (309a'; 309b') all the time. The UE mobility in UTRAN in RRC Connected mode has two modes (a) using network ordered Handover and (b) using UE-autonomous cell reselection. Both cases are handled in similar ways. In the case of intra-RNC mobility, then the RNC will know about the UE location and build the history about mobility behaviour. The granularity of location knowledge is mostly on cell level (in UE states Cell_DCH. Cell_FACH or Cell_PCH), but as a minimum on URA level (in state URA_PCH). In the case of inter-RNC mobility, then the source RNC may forward the information element UE History Information, to the target RNC, in the same way as done between E-UTRAN eNBs.

The RNC (302a'; 302b'; 302c') may report the mobility behaviour of UEs 301 to the MSC/SGSN 303' in the mobile CN using a new RANAP message or a new parameter in existing RANAP message on an existing signalling connection, for example when the RANAP signalling connection is being released. Alternatively, since a permanent UE identifier is known in the RNC (302a'; 302b'; 302c'), the RNC (302a'; 302b'; 302c') could report the mobility behaviour of the UE 301 to another node, such as an O&M node which in its turn could update the HLR/HSS 306. Information reported would again comprise UE type i.e. moving type or stationary type. Additionally, an actual location of the UE may be reported as well and a RNC identifier (RNC-D) when appropriate.

Following above, the MSC/SGSN 303' reports the mobility behaviour of UEs to the HLR/HSS 306. The UE information reported comprises UE type i.e. mobile type or stationary type. Additionally, an actual location of the UE is reported as well. The MSC/SGSN 303' may report the mobility behaviour of a UE 301 to the HLR/HSS 306 using a new MAP message or new parameter(s) in existing MAP message, for example when UE context is released in the MSC/SGSN 303'.

The RNC (302a'; 302b'; 302c') is, in most cases, connected to a Circuit-Switched Core Network (CS CN), i.e. via the MSC, and to a Packet-switched Core Network (PS CN), i.e. via the SGSN, at the same time. Either one of the MSC or the SGSN, or both may be in active communication with the RNC (302a'; 302b'; 302c'). In one example, only the PS CN may be involved in the UE type detection/determination. In another example, the RNC indicates to the PS CN or CS CN when RRC Connection is released and which one of the PS CN and CS CN should update the HLR/HSS 306.

Note, that in a so called 3G Flat Architecture the RNC (302a'; 302b'; 302c') functionality logically resides in the NodeB (NB) i.e. building up a combined radio base station and RNC node. Thus, the local GW service area will cover one or more such combined NBs in such a system.

In a second aspect of the third example, a SGSN based UE type determination/detection will now be described. In this second aspect the SGSN 303' may, at least theoretically, determine/detect that a UE 301 is of a stationary type or of mobile type based on UE mobility behaviour i.e. UE movements in relation to a defined local GW service area (309a'; 309b'). One such way is the different service requests received from the UE 301 as these always include both a current Service Area Identifier (SA) and RNC-ID. Another possibility for UEs in connected mode would be an absence of so called Serving Radio Network Subsystem (RNS) Relocations. However, if Iur-mobility is applied in the RAN then Serving RNS Relocations are not performed. The Iur is an Interface in a UMTS network located between two RNCs.

Following above, the SGSN 303' may also subscribe to the RAN and ask to be informed whenever a SA of the UE changes. This possibility would overcome the limitations in the case when Iur-mobility is used.

Figure 8:
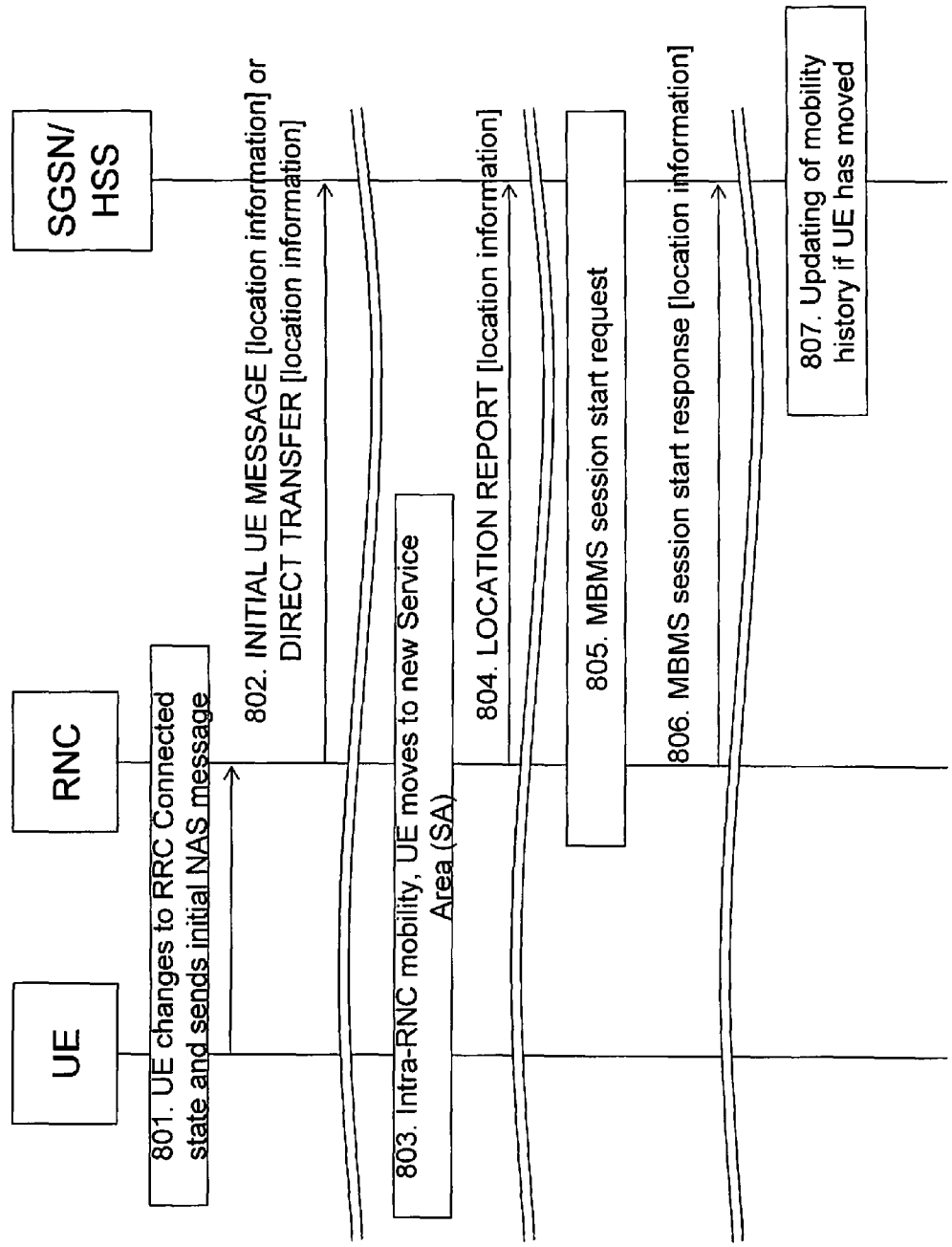
FIG. 8 is a schematic scheme illustrating an example of an embodiment relating to a SGSN based UE type determination/detection.

This example may be illustrated as in FIG. 8.

In step 801 the UE 301 changes to RRC Connected state, and sends an initial NAS message to the RNC (302a'; 302b'; 302c').

In step 802 the RNC forwards uplink NAS message and may also add UE location state information, before forwarding the NAS message to the SGNS/HSS (303'; 306).

In step 807 the UE state information may be determined by (a) any change of position compared to the last known position and (b) the reported new position.

Steps 803-806 are similar to the aforementioned, but triggered by other events such as in step 803 intra-RNC mobility wherein the UE moves to a new Service Area (SA) which is followed by step 804 in which the RNC receiving intra-RNC mobility information forwards a location report comprising location information to the SGSN and/or HSS. In the other event stating with step 805 the RNC sends an MBMS session start request to the SGNS/HSS and then, step 806, the SGSN/HSS sends MBMS session start response to the RNC. The MBMS session start response comprising location information.

Following is a fourth example presented for a UE based determination of the type of the UE in an LTE or WCDMA network. According to this fourth example, the UE 301 itself may report its mobility behaviour to a RAN or mobile CN node (302a; 302b; 302c; 302a'; 302b'; 302c'; 303; 303'; 306) i.e. eNB, SGSN, MSC, RNC, HLR, HSS or MME. The UE may report using a new NAS message or a new parameter in an existing NAS message on an existing signalling connection, for example when UE is released or when UE context is created.

Continuing from above, the CN node may then report the mobility behaviour to the HLR/HSS using a new MAP message or a new parameter in existing MAP message, for example when UE context is created or released. Information reported may comprise UE type i.e. mobile type or stationary type, which is determined based on the mobility behaviour of the UE in relation to a defined local GW service area. The actual location of the UE may also be reported and other relevant information that may be dependant on existing technology or network.

In an example of an embodiment, the HLR/HSS stores obtained/received UE type and other information such as location information, requested service and previous UE history information, in a round stepping buffer i.e. per UE. In one example, a number of reported events, for example 10 events are stored in a storage circuit e.g, the storing circuit 504, and if a certain number of consecutive events are determined to be the same the UE type is considered to be stationary in a particular location. Then, this knowledge may be used in selecting of gateway.

The above mentioned examples, methods and network nodes provide each of them or at least some of them a possibility to dynamically determine/detect and keep track of the mobility behaviour of a UE on different levels e.g, if a UE is of a stationary type or not. Thereby simplifying and reducing the costs of managing the wireless communications network (300a; 300b). The knowledge about mobility behaviour i.e. UE movements in relation to a defined local GW service area, may further be used to select an appropriate gateway, and further reduce OPEX.

A further advantage achieved by at least some of the above mentioned embodiments is that a network may be extended with more gateways without requiring extensive operation and maintenance tasks in the mobile CN since a presence of such gateways may dynamically be signalled.

The above mentioned method and network node embodiments for selecting a gateway to a user equipment 301 in a wireless communications network (300a; 300b) may be implemented through use of one or more processors, such as a processor 505 in the network node 500, depicted in FIG. 5, together with computer program code for performing the functions of the method embodiments. The program code mentioned above may also be provided as a computer program product, for instance in the form of a data carrier carrying computer program code for performing the method embodiments when being loaded into the network node 500. One such carrier may be in the form of a CD ROM disc. It is however feasible with other data carriers such as a memory stick or an external hard drive disk. The computer program code can furthermore be provided as pure program code on a server and downloaded to the network node 500 remotely.

When using the word "comprise" or "comprising" it shall be interpreted as non-limiting. i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for selecting a gateway for a user equipment in a wireless communications network, the wireless communications network comprising the network node and at least two gateways configured to provide packet data network connectivity to the user equipment located within a served cell, the method comprising:
   detecting a presence of a local gateway, serving a local gateway service area, among the at least two gateways;
   obtaining user equipment information comprising a type of the user equipment, the type of the user equipment being one of a stationary type or a mobile type, and wherein the type of the user equipment is determined based on user equipment mobility behavior in relation to the local gateway service area; and
   selecting from among the at least two gateways, the detected local gateway when the UE is determined to be the stationary type, or selecting a global gateway when the UE is determined to be the mobile type, for providing packet data network connectivity to the user equipment.

2. The method according to claim 1, wherein the obtained user equipment information also includes a service type requested by the user equipment, and wherein the selecting is based on both the determined type of the user equipment and on the service type requested by the user equipment.

3. The method according to claim 1, wherein the selecting step also includes selecting the local gateway or another gateway based on user equipment information comprising user equipment actual location in the wireless communications network.

4. The method according to claim 1, wherein the obtaining step includes obtaining the user equipment information from the user equipment.

5. The method according to claim 1, wherein the obtaining step includes obtaining the user equipment information from a Home Location Register, HLR, or from a Home Subscriber Server, HSS, where the user equipment information is stored.

6. The method according to claim 1, wherein the detecting step is performed by receiving address information for the local gateway via, or directly from, one or more of the following nodes: a radio access node; a eNodeB; a Radio Network Controller, RNC; a Mobility Management Entity, MME; and a Serving GPRS Support Node, SGSN.

7. The method according to claim 1, wherein the obtaining step also includes obtaining information indicating a capability of the local gateway, and wherein the selecting step also includes selecting the local gateway or another gateway based on the obtained information indicating the capability of the local gateway.

8. A network node for selecting a gateway for a user equipment in a wireless communications network, the wireless communications network comprising the network node and at least two gateways configured to provide packet data network connectivity to the user equipment located within a served cell, wherein the network node comprises:
   a detecting circuit configured to detect a presence of a local gateway, serving a local gateway service area, among the at least two gateways;
   an obtaining circuit configured to obtain user equipment information including a type of the user equipment, the type of the user equipment being one of a stationary type or a mobile type, and wherein the type of the user equipment is determined based on user equipment mobility behavior in relation to the local gateway service area; and
   a selecting circuit configured to select among the at least two gateways, the detected local gateway when the UE is determined to be the stationary type, or a global gateway when the UE is determined to be the mobile type, for providing packet data network connectivity to the user equipment.

9. The network node of claim 8, wherein the local gateway is located in a radio access network and the other gateway is a global gateway located in a mobile core network.

10. The network node of claim 8, wherein the mobility behavior includes information about user equipment movement between cells in the wireless communications network.

11. The network node of claim 8, wherein the local gateway service area is predefined to include one or more of the following: a Radio Base Station; an eNodeB; and a Radio Network Controller, RNC, to be served by the local gateway.

12. The network node of claim 8, wherein the local gateway includes at least partial functionality of a serving gateway and a packet data network gateway.

13. The network node of claim 8, wherein the obtained user equipment information indicating the type of the user equipment is received at the network node as part of user equipment data when a user equipment context is created.

14. The network node of claim 8, wherein the obtained user equipment information indicating the type of the user equipment is received at the network node as part of an attach message sent from the user equipment.

15. The network node of claim 8, wherein the obtaining circuit is further configured to obtain the user equipment information from a storing unit located in one or more of the following: the user equipment, a Mobility Management Entity, MME; a Home Location Register, HLR; a Home Subscriber Server, HSS; a Serving GPRS Support Node, SGSN; a Radio Network Controller, RNC; and an eNodeB.

16. The network node of claim 8, wherein the network node is a Mobility Management Entity, MME.

* * * * *